United States Patent
Huang et al.

(10) Patent No.: US 12,437,752 B2
(45) Date of Patent: *Oct. 7, 2025

(54) LARGE-SCALE LANGUAGE MODEL DATA SELECTION FOR RARE-WORD SPEECH RECOGNITION

(71) Applicant: Google LLC, Mountain View, CA (US)

(72) Inventors: Wenqian Ronny Huang, Mountain View, CA (US); Tara N. Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,655

(22) Filed: May 10, 2024

(65) Prior Publication Data

US 2024/0290323 A1 Aug. 29, 2024

Related U.S. Application Data

(63) Continuation of application No. 17/643,861, filed on Dec. 13, 2021, now Pat. No. 12,014,725.

(Continued)

(51) Int. Cl.
*G10L 15/06* (2013.01)
*G06N 3/02* (2006.01)
(Continued)

(52) U.S. Cl.
CPC .............. *G10L 15/063* (2013.01); *G06N 3/02* (2013.01); *G10L 15/16* (2013.01); *G10L 15/197* (2013.01); *G10L 15/22* (2013.01)

(58) Field of Classification Search
None
See application file for complete search history.

(56) References Cited

U.S. PATENT DOCUMENTS 6,622,119 B1 9/2003 Ramaswamy et al.
9,575,952 B2 * 2/2017 Kumar Rangarajan Sridhar ........ H04W 4/14

(Continued)

OTHER PUBLICATIONS

International Search Report and Written Opinion for the related application No. PCT/US2021/063004, dated Jun. 7, 2022, 51 pages.
Ronny Huang W et al: Sentence-Select: Large-Scale Language Model Data Selection for Rare-Word Speech Recognition 11, arxiv.org, Cornell University Library, 201 Olin Library Cornell University Ithaca, NY 14853, Mar. 9, 2022 (Mar. 9, 2022), XP091179576, abstract section 2.2, 5 pages.

(Continued)

*Primary Examiner* — Jesse S Pullias
(74) *Attorney, Agent, or Firm* — Honigman LLP; Brett A. Krueger; Grant Griffith

(57) ABSTRACT

A method of training a language model for rare-word speech recognition includes obtaining a set of training text samples, and obtaining a set of training utterances used for training a speech recognition model. Each training utterance in the plurality of training utterances includes audio data corresponding to an utterance and a corresponding transcription of the utterance. The method also includes applying rare word filtering on the set of training text samples to identify a subset of rare-word training text samples that include words that do not appear in the transcriptions from the set of training utterances or appear in the transcriptions from the set of training utterances less than a threshold number of times. The method further includes training the external language model on the transcriptions from the set of training utterances and the identified subset of rare-word training text samples.

20 Claims, 7 Drawing Sheets

Related U.S. Application Data

(60) Provisional application No. 63/261,946, filed on Sep. 30, 2021.

(51) Int. Cl.
 G10L 15/16 (2006.01)
 G10L 15/197 (2013.01)
 G10L 15/22 (2006.01)

(56) References Cited

U.S. PATENT DOCUMENTS

| | | | | |
|---|---|---|---|---|
| 10,606,946 | B2* | 3/2020 | Gao | G06N 20/00 |
| 12,014,725 | B2* | 6/2024 | Huang | G10L 15/063 |
| 2003/0191625 | A1* | 10/2003 | Gorin | G06F 40/295 |
| | | | | 704/E15.022 |
| 2012/0278060 | A1* | 11/2012 | Cancedda | G06F 40/44 |
| | | | | 704/2 |
| 2019/0095430 | A1* | 3/2019 | Smus | G06F 40/58 |
| 2020/0349922 | A1 | 11/2020 | Peyser et al. | |
| 2020/0357388 | A1 | 11/2020 | Zhao et al. | |
| 2021/0374361 | A1* | 12/2021 | Wick | G06F 40/58 |
| 2022/0139380 | A1 | 5/2022 | Meng et al. | |

OTHER PUBLICATIONS

Cal Peyser et al: "Improving Tail Performance of a Deliberation E2E ASR Model Using a Large Text Corpus", arxiv. org, Aug. 24, 2020 (Aug. 24, 2020), XP081747210, abstract, 5 pages.

Sainath Tara N. et al: "An Efficient Streaming Non-Recurrent On-Device End-to-End Model with Improvements to Rare-Word Modeling", INTERSPEECH 2021, Aug. 31, 2021 (Aug. 31, 2021), pp. 1777-1781, XP055864192, ISCA DOI: 10.21437/Interspeech. 2021-206 abstract, 5 pages.

Florian Lux et al: "Meta-Learning for improving rare word recognition in end-to-end ASR", arxiv.org, Cornell University Library, 201 Olin Library Cornell University Ithaca, NY 14853, Feb. 25, 2021 (Feb. 25, 2021), XP081891788, abstract; figure 1, 5 pages.

Fernandez et al. "Sampling Informative Training Data for RNN Language Models". Proceedings of ACL 2018, Student Research Workshop, pp. 9-13 Melbourne Australia, Jul. 15-20, 2018 (Year: 2018).

Meng et al. "Internal Language Model Adaption with Text-Only Data for End-to-End Speech Recognition". arxiv.org/abs/2110. 05354v1 [cs.CL] Oct. 6, 2021 (Year: 2021).

* cited by examiner

LARGE-SCALE LANGUAGE MODEL DATA SELECTION FOR RARE-WORD SPEECH RECOGNITION

CROSS REFERENCE TO RELATED APPLICATIONS

This U.S. patent application is a continuation of, and claims priority under 35 U.S.C. § 120 from, U.S. patent application Ser. No. 17/643,861, filed on Dec. 13, 2021, which claims priority under 35 U.S.C. § 119(e) to U.S. Provisional Application No. 63/261,946, filed on Sep. 30, 2021. The disclosures of these prior applications are considered part of the disclosure of this application and are hereby incorporated by reference in their entireties.

TECHNICAL FIELD

This disclosure relates to large-scale language model data selection for rare-word speech recognition.

BACKGROUND

Automated speech recognition (ASR) systems have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system. These E2E automatic speech recognition (ASR) systems have made tremendous progress, surpassing conventional ASR systems in several common benchmarks including word error rates (WER). The architecture of E2E ASR models are largely application dependent. For instance, a number of applications that involve user interaction, such as voice-search or on-device dictation, require the model to perform recognition in a streaming fashion. Other applications, like offline video captioning, do not require the model to be streaming and can make use of future context to improve performance. Additionally, existing E2E models experience high failure rates in recognizing rare words not seen during training. Rare word recognition is improved by training an external language model on large-scale training datasets.

SUMMARY

One aspect of the disclosure provides a computer-implemented method of training a language model for rare-word speech recognition. The computer-implemented method when executed on data processing hardware causes the data processing hardware to perform operations that include obtaining a set of training text samples, and obtaining a set of training utterances used for training an automatic speech recognition (ASR) model. Each training utterance in the plurality of training utterances includes audio data corresponding to an utterance and a corresponding transcription of the utterance. The operations also include applying rare word filtering on the set of training text samples to identify a subset of rare-word training text samples that include words that do not appear in the transcriptions from the set of training utterances or appear in the transcriptions from the set of training utterances less than a threshold number of times. The operations further include training the external language model on the transcriptions from the set of training utterances and the identified subset of rare-word training text samples.

Implementations of the disclosure may include one or more of the following optional features. In some implementations, obtaining the set of training text samples includes receiving a corpus of training text samples, executing a resampling function on the corpus of training text samples to identify high frequency text samples that occur in the corpus of training text samples, and obtaining the set of training text samples by removing the identified high frequency text samples from the corpus of training text samples. In some examples, the resampling function includes one of a simple power resampling function, a forced power resampling function, or a soft logarithmic resampling function.

In some implementations, the operations further include applying contrastive filtering on the set of training text samples to identify a subset of target domain training text samples that match a target domain associated with the set of training utterances. Here, training the external language model on the transcriptions from the set of training utterances and the identified subset of rare-word training text samples further includes training the external language model on the identified subset of target domain training text samples that match the target domain. In some examples, the external language model includes an external neural language model. In these examples, the external neural language model may include a stack of conformer layers or transformer layers.

In some implementations, the operations further include integrating the trained external language model with the trained ASR model. The trained external language model is configured to rescore probability distributions over possible speech recognition hypotheses predicted by the trained ASR model. In these implementations, the ASR model includes a first encoder, a second encoder, and a decoder. The first encoder is configured to receive, as input, a sequence of acoustic frames, and generate, at each of a plurality of output steps, a first higher order feature representation for a corresponding acoustic frame in the sequence of acoustic frames. The second encoder is configured to receive, as input, the first higher order feature representation generated by the first encoder at each of the plurality of output steps, and generate, at each of the plurality of output steps, a second higher order feature representation for a corresponding first higher order feature frame. The decoder is configured to receive, as input, the second higher order feature representation generated by the second encoder at each of the plurality of output steps, and generate, at each of the plurality of time steps, a first probability distribution over possible speech recognition hypotheses.

In these implementations, the decoder may be further configured to receive, as input, the first higher order feature representation generated by the first encoder at each of the plurality of output steps, and generate, at each of the plurality of time steps, a second probability distribution over possible speech recognition hypothesis. Additionally, the decoder may include a prediction network and a joint network. When the ASR model is operating in a streaming mode, the prediction network is configured to receive, as input, the average embedding generated by the prediction network at each of the plurality of output steps and the first higher order feature representation generated by the first encoder at each of the plurality of output steps, and generate, at each of the plurality of output steps, the second probability distribution over possible speech recognition hypothesis. Alternatively, when the ASR model is operating in a non-streaming mode, the prediction network is configured to receive, as input, the average embedding generated by the prediction network at each of the plurality of output steps and the second higher order feature representation generated by the second encoder at each of the plurality of output steps, and generate the first probability distribution over possible speech recognition hypothesis.

Additionally or alternatively, the first encoder may include a causal encoder including an initial stack of conformer layers. Here, the second encoder may include a non-causal encoder including a final stack of conformer layers overlain on the initial stack of conformer layers. The first encoder and the second encoder of the ASR model may be trained using Hybrid Autoregressive Transducer Factorization to facilitate the integration of the external language model trained on text-only data including the transcriptions from the set of training utterances and the identified subset of rare-word training text samples.

Another aspect of the disclosure provides a system for training a language model for rare-word speech recognition. The system includes data processing hardware and memory hardware in communication with the data processing hardware. The memory hardware stores instructions that when executed on the data processing hardware causes the date processing hardware to perform operations including obtaining a set of training text samples, and obtaining a set of training utterances used for training an automatic speech recognition (ASR) model. Each training utterance in the plurality of training utterances includes audio data corresponding to an utterance and a corresponding transcription of the utterance. The operations also include applying rare word filtering on the set of training text samples to identify a subset of rare-word training text samples that include words that do not appear in the transcriptions from the set of training utterances or appear in the transcriptions from the set of training utterances less than a threshold number of times. The operations further include training the external language model on the transcriptions from the set of training utterances and the identified subset of rare-word training text samples.

This aspect may include one or more of the following optional features. In some implementations, obtaining the set of training text samples includes receiving a corpus of training text samples, executing a resampling function on the corpus of training text samples to identify high frequency text samples that occur in the corpus of training text samples, and obtaining the set of training text samples by removing the identified high frequency text samples from the corpus of training text samples. In some examples, the resampling function includes one of a simple power resampling function, a forced power resampling function, or a soft logarithmic resampling function.

In some implementations, the operations further include applying contrastive filtering on the set of training text samples to identify a subset of target domain training text samples that match a target domain associated with the set of training utterances. Here, training the external language model on the transcriptions from the set of training utterances and the identified subset of rare-word training text samples further includes training the external language model on the identified subset of target domain training text samples that match the target domain. In some examples, the external language model includes an external neural language model. In these examples, the external neural language model may include a stack of conformer layers or transformer layers.

In some implementations, the operations further include integrating the trained external language model with the trained ASR model. The trained external language model is configured to rescore probability distributions over possible speech recognition hypotheses predicted by the trained ASR model. In these implementations, the ASR model includes a first encoder, a second encoder, and a decoder. The first encoder is configured to receive, as input, a sequence of acoustic frames, and generate, at each of a plurality of output steps, a first higher order feature representation for a corresponding acoustic frame in the sequence of acoustic frames. The second encoder is configured to receive, as input, the first higher order feature representation generated by the first encoder at each of the plurality of output steps, and generate, at each of the plurality of output steps, a second higher order feature representation for a corresponding first higher order feature frame. The decoder is configured to receive, as input, the second higher order feature representation generated by the second encoder at each of the plurality of output steps, and generate, at each of the plurality of time steps, a first probability distribution over possible speech recognition hypotheses.

In these implementations, the decoder may be further configured to receive, as input, the first higher order feature representation generated by the first encoder at each of the plurality of output steps, and generate, at each of the plurality of time steps, a second probability distribution over possible speech recognition hypothesis. Additionally, the decoder may include a prediction network and a joint network. When the ASR model is operating in a streaming mode, the prediction network is configured to receive, as input, the average embedding generated by the prediction network at each of the plurality of output steps and the first higher order feature representation generated by the first encoder at each of the plurality of output steps, and generate, at each of the plurality of output steps, the second probability distribution over possible speech recognition hypothesis. Alternatively, when the ASR model is operating in a non-streaming mode, the prediction network is configured to receive, as input the average embedding generated by the prediction network at each of the plurality of output steps and the second higher order feature representation generated by the second encoder at each of the plurality of output steps, and generate the first probability distribution over possible speech recognition hypothesis.

Additionally or alternatively, the first encoder may include a causal encoder including an initial stack of conformer layers. Here, the second encoder may include a non-causal encoder including a final stack of conformer layers overlain on the initial stack of conformer layers. The first encoder and the second encoder of the speech recognition model may be trained using Hybrid Autoregressive Transducer Factorization to facilitate the integration of the external language model trained on text-only data including the transcriptions from the set of training utterances and the identified subset of rare-word training text samples.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

End-to-end (E2E) automatic speech recognition (ASR) models are traditionally structured to operate in either a streaming mode or a non-streaming mode. Conventionally, an E2E ASR model includes an encoder and a decoder as the main components. Applications that involve end-user interaction, like voice-search or on-device dictation, may require the model to perform recognition in a streaming fashion, where the words are expected to be output as they are spoken with as little latency as possible. This prevents the use of models that use future context to improve accuracy, such as bi-directional LSTMs. By contract, applications such as offline video captioning do not require streaming recognition and may make full use of any available future context to improve performance. Furthermore, conventional E2E ASR models are trained on a small fraction of audio-text pairs as compared to over 100 billion text utterances that a conventional model is trained with, and thus performs poorly on long-tail proper nouns and rare words.

Implementations herein are directed toward a single E2E ASR model in combination with an on-device neural language model trained on data selected to improve the ASR model's recognition quality of rare words. More particularly, implementations herein are directed toward a data selection pipeline for selecting a sufficient subset of training data suitable for training the language model to improve recognition quality of rare words and long-tail proper nouns. The ASR model may use cascaded encoders that include streaming and non-streaming encoders, and a single decoder that learns to decode either using the output of the streaming or the non-streaming encoder to enable the ASR model to operate in streaming or non-streaming modes. In addition to ASR models, the architecture can apply to other models such as machine translation that implement both streaming and non-streaming modes.

Figure 1A:
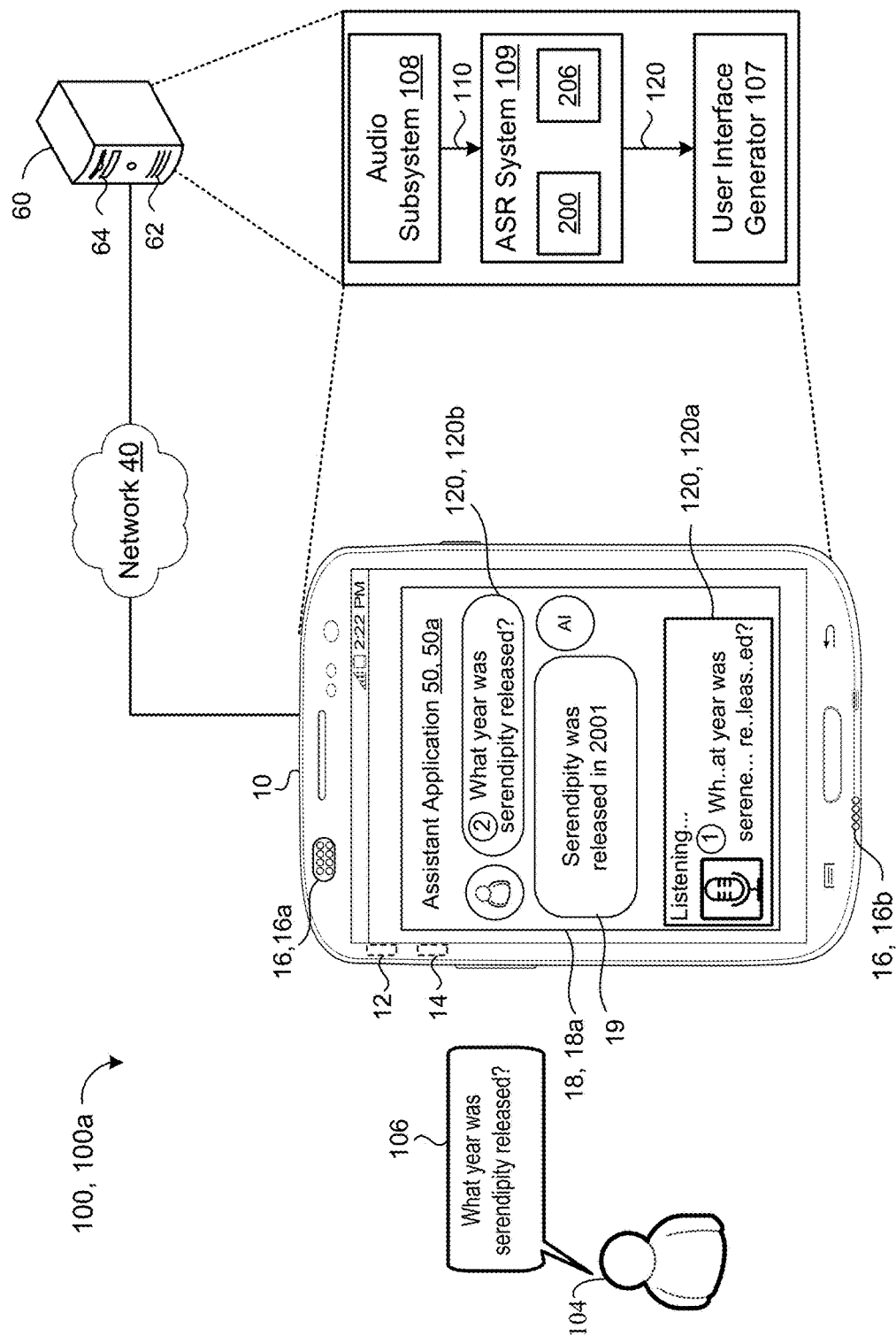
FIGS. 1A and 1B are schematic views of example speech environments using a speech recognition model and external language model architecture for automatic speech recognition.
Figure 1B:
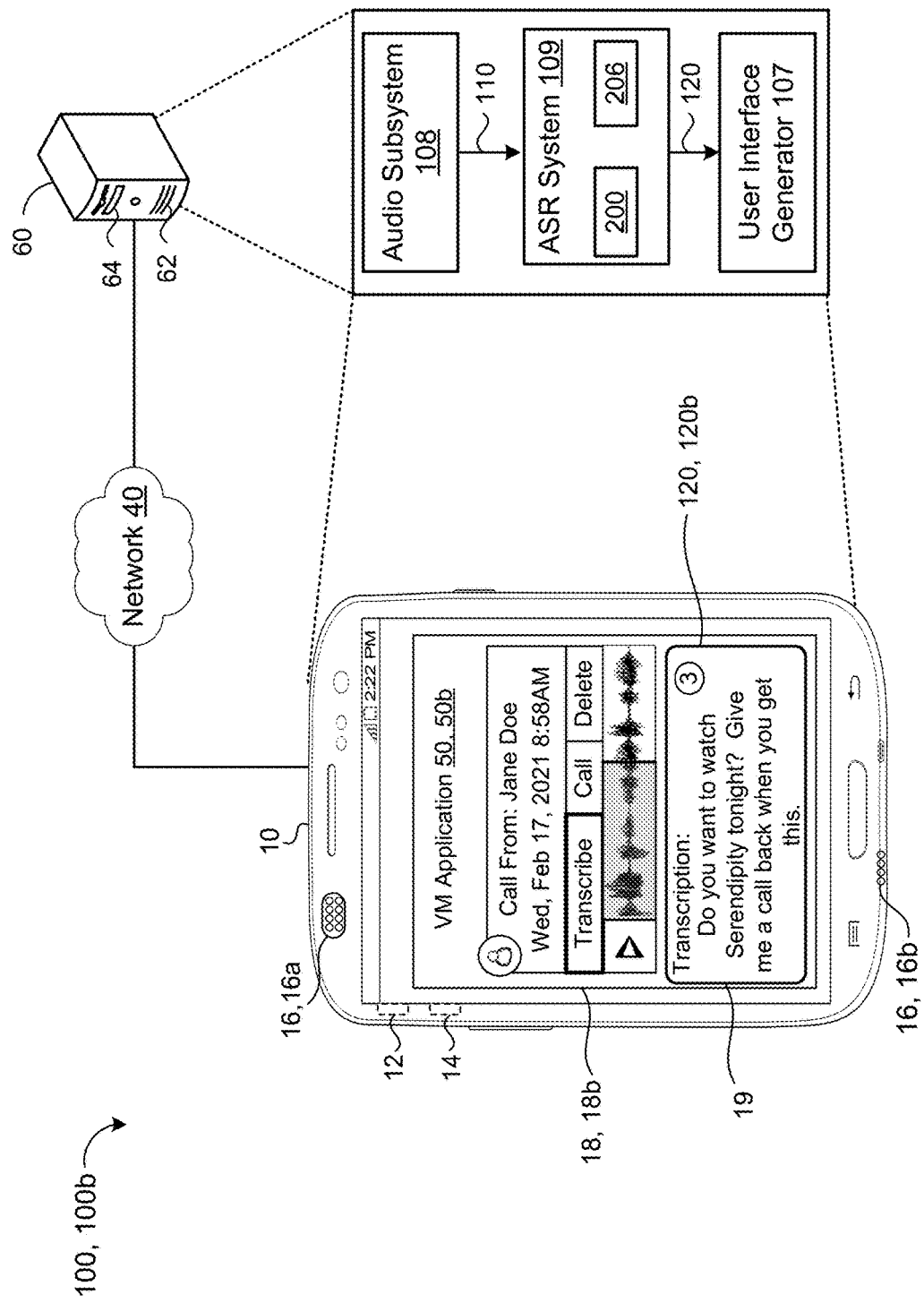

FIGS. 1A and 1B are examples of a speech environment 100, 100a-b. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 109 implementing an ASR model 200 (also referred to as the model 200) integrated with an external language model (LM) 206 resides on the user device 10 of the user 104 and/or on a remote computing device 60 (e.g., one or more remote servers of a distributed system executing in a cloud-computing environment) in communication with the user device 10 via a network 40. The remote computing device 60 may include remote resources, such as remote data processing hardware 62 (e.g., remote servers or CPUs) and/or remote memory hardware 64 (e.g., remote databases or other storage hardware). The user device 10 and/or the remote computing device 60 also includes an audio subsystem 108 configured to receive the utterance 106 spoken by the user 104 and captured by the audio capture device 16a, and to convert the utterance 106 into a corresponding digital format associated with input acoustic frames 110 capable of being processed by the ASR system 109. In the example shown in FIG. 1A, the user 104 speaks a respective utterance 106 and the audio subsystem 108 converts the utterance 106 into corresponding audio data (e.g., acoustic frames) 110 for input to the ASR system 109. Thereafter, the model 200 receives, as input, the audio data 110 corresponding to the utterance 106, and generates/predicts, as output, a corresponding transcription 120 (also referred to as a recognition result/hypothesis 120) of the utterance 106.

The model 200 also includes a decoder 204 (FIG. 2) (also referred to as a shared decoder 204) shared between its encoders which enables the model 200 to be a single model that can operate in streaming and non-streaming mode (e.g., in contrast with two separate models where each model is dedicated to either a streaming mode or non-streaming mode). For instance, as shown in FIG. 1A, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In these scenarios where the application demands minimal latency, the model 200 operates in a streaming mode where the model 200 may provide streaming transcription capabilities in real-time as the user 104 is speaking the utterance 106. On the other hand, when the user 104 has a higher tolerance for speech recognition latency and/or the utterance 106 to be recognized is associated with long-form speech (i.e., referring to speech consisting of full paragraphs or multiple sentences), the same model 200 may operate in a non-streaming mode and may leverage a prediction network to provide an accurate transcription 120, but incur increased latency.

Additionally, the user 104 requires that the ASR system 109 of the user device 10 is able to accurately identify rare words or long-tail proper nouns, which can be achieved through use of the LM 206 with the model 200 to help bias the output of the model 200 when detecting rare words or proper nouns. As described in greater detail below with reference to FIG. 4, the LM 206 may be trained with data sets obtained through differing data selection strategies to reduce the amount of text-only 1 training data needed to train the LM 206 to accurately bias the output of the model 200 to detect rare words or proper nouns. Accordingly, the ASR system 109 may implement a single ASR model that includes cascaded encoders 210, 220, for a multitude of different speech recognition tasks to provide both streaming and non-streaming transcription capabilities without having to leverage separately trained ASR models on a task-by-task basis while also using the LM 206 to increase the accuracy of the transcription 120 when the utterance 106 includes rare words or long-tail proper nouns.

In some implementations, the model 200 performs streaming encoding on the audio data 110 first and then performs non-streaming encoding on the output of the streaming encoder. For instance, in the example shown, the model 200 performs streaming speech recognition on the audio data 110 using a first encoder (i.e., a low latency encoder) to produce partial speech recognition results 120, 120*a*, and non-streaming speech recognition on the encoded audio data 110 using a second encoder (i.e., a high latency encoder) to produce a final speech recognition result 120, 120*b*. Notably, the first encoder produces the partial speech recognition results 120*a* while the second encoder waits for the output of the first encoder to produce the final speech recognition result 120*b*. Thus, the final speech recognition result 120*b* for the input utterance 106 may be delayed from the partial speech recognition results 120*a* for the input utterance by a duration.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120*a* in a streaming fashion during time 1 and subsequently display the final speech recognition result 120*b* during time 2. In some configurations, the transcription 120 output from the ASR system 109 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example of FIG. 1A, the user 104 in the speech environment 100*a* interacts with a program or application 50 (e.g., the digital assistant application 50*a*) of the user device 10 that uses the ASR system 109. For instance, FIG. 1A depicts the user 104 communicating with the digital assistant application 50*a* and the digital assistant application 50*a* displaying a digital assistant interface 18 on a screen of the user device 10 to depict a conversation between the user 10 and a digital assistant of the digital assistant application 50*a*. In this example, the user 104 asks the digital assistant application 50*a*, "What year was Serendipity released?" This question from the user 104 is a spoken utterance 106 captured by the audio capture device 16*a* and processed by audio systems 16 of the user device 10. In this example, the audio system 16 receives the spoken utterance 106 and converts it into acoustic frames 110 for input to the ASR system 109.

Continuing with the example, the model 200, while receiving the acoustic frames 110 corresponding to the utterance 106 as the user 104 speaks, encodes the acoustic frames 110 using a first encoder 210 (i.e., FIG. 2) and then decodes an encoded representation of the acoustic frames 110 using a decoder 204 (FIG. 2) into the partial speech recognition results 120*a*. During time 1, the user interface generator 107 presents, via the digital assistant interface 18, a representation of the partial speech recognition results 120*a* of the utterance 106 to the user 104 of the user device 10 in a streaming fashion such that words, word pieces, and/or individual characters appear on the screen as soon as they are spoken.

After all (or some amount) of the acoustic frames 110 corresponding to the utterance 106 are received, and the first encoder 210 has encoded these acoustic frames 110, the second encoder 220 (i.e., FIG. 2A) encodes the encoding output from the first encoder 210 to generate an encoding for the set of acoustic frames 110 corresponding to the utterance 106 already encoded by the first encoder 210. The decoder 204 then decodes the acoustic frames 110 that have been encoded by the second encoder 220 and processes the decoded acoustic frames 110 using the LM 206, which rescores the decoded acoustic frames and generates a final speech recognition result 120*b*. For example, when the first encoder 210 encodes all of the acoustic frames 110 corresponding to the utterance 106 (e.g., as the acoustic frames 110 are received), the second encoder 220 encodes all of the acoustic frames 110 that have been encoded by the first encoder 210. In this respect, by encoding over multiple encoded acoustic frames 110, the second encoder 210 is able to provide greater contextual awareness (e.g., by receiving representations of all of the acoustic frames 110 for the utterance 106) in a non-streaming fashion which may potentially reconcile or correct aspect(s) of the utterance 106 missed or misinterpreted by the streaming nature of the first encoder 210.

In some examples, an indication, such as an endpoint, that identifies that the user 104 has finished speaking the utterance 106 functions to trigger the second encoder 220 of the model 200 to encode all the acoustic frames 110. In other examples, the second encoder 220 encodes the acoustic frames 110 in parallel with the first encoder 210 and the first encoder 210 identifies the endpoint at the end of the utterance 106, thereby triggering the second encoder 220 to emit the final speech recognition result 120b. The endpoint identified by the first encoder 210 may simultaneously trigger a microphone closing event. During time 2, the user interface generator 107 presents, via the digital assistant interface 18, a representation of the final speech recognition result 120b of the utterance 106 to the user 104 of the user device 10. In some implementations, the user interface generator 107 replaces (or modifies) the representation of the partial speech recognition results 120a with the representation of the final speech recognition result 120b. In this example, the utterance 106 of the user 104 contains a rare word "Serendipity" that the model 200 has not been trained on. Accordingly partial speech recognition results 120a output by the model 200 and displayed on the screen at time 1 incorrectly predicts that the utterance 106 of the user 104 is "What year was serene released?" The final speech recognition result 120b output by the model 200 and displayed on the screen at time 2 at increased latency improves the speech recognition quality in terms of accuracy by identifying that the user 104 said "Serendipity." However, since the user interface generator 107 displays the partial speech recognition results as the user speaks the utterance 106, the higher latency associated with producing, and ultimately displaying the final speech recognition result 120b is less noticeable to the user 104.

In some implementations, the model 200 utilizes a pre-fetching technique that reduces latency by fetching speech recognition results before the final speech recognition result 120b is available. Here, if the partial speech recognition results 120a match the final speech recognition result 120b, the response fetched for the partial speech recognition results 120a can be emitted instantly to save execution latency that typically occurs after the final speech recognition result 120b is complete.

In the example shown in FIG. 1A, the digital assistant application 50a may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50a uses natural language processing to recognize that the question from the user 10 regards the user's environment and more particularly a song playing in the user's vicinity. By recognizing these details with natural language processing, the automated assistant returns a response 19 to the user's query where the response 19 states, "Serendipity was released in 2001." In some configurations, natural language processing occurs on the remote computing device 60 in communication with the data processing hardware 12 of the user device 10.

FIG. 1B is another example of speech recognition with the ASR system 109 of the speech environment 100b. As shown in the example, the user 104 interacts with a voicemail application 50, 50b displaying a voicemail application interface 18, 18b on the screen of the user device 10 to transcribe a voicemail that was left for the user 104 by Jane Doe. In this example, latency is not important; however, accuracy of the transcription when processing long-tail proper nouns or rare words is important. The model 200 of the ASR system 109 and the LM 206 are able to take advantage of the full context of the audio by waiting until all of the acoustic frames 110 corresponding to the voicemail are generated. This voicemail scenario also illustrates how the model 200 is capable of handling a long-form of speech because a voicemail is often multiple sentences or even several paragraphs. The ability to handle long-form speech is particularly advantageous over other ASR models, such as two-pass models with LAS decoders, because these two pass-models often suffer from long-form issues (e.g., a higher word deletion rate on long-form speech) when applied to long-form conditions. For instance, by using an RNN-T decoder as the decoder 204 in combination with cascading encoders 202 (e.g., the first encoder 210 and the second encoder 220), the model 200 operates for both long-form speech and short-form speech without the long-form setbacks.

With continued reference to FIG. 1B, as discussed with respect to FIG. 1A, the model 200 encodes the acoustic frames 110 using the first encoder 210 while receiving the acoustic frames 110. After the model 200 receives all of the acoustic frames 110 and encodes them with the first encoder 210, the model 200 provides the first encoder output as input to the second encoder 220. The second encoder 220 encodes the first encoder output before the decoder 204 generates an embedding and the LM 206 rescores the decoder 204 output to generate the final speech recognition result 120b. During time 3, the user interface generator 107 presents, via the digital assistant interface 18b, a representation of the final speech recognition result 120b without first displaying the partial speech recognition results 120a. For example, the final speech recognition result 120b is a transcript of the long-form voicemail from Jane Doe that states, "Do you want to watch Serendipity tonight? Give me a call back when you get this."

Figure 2:
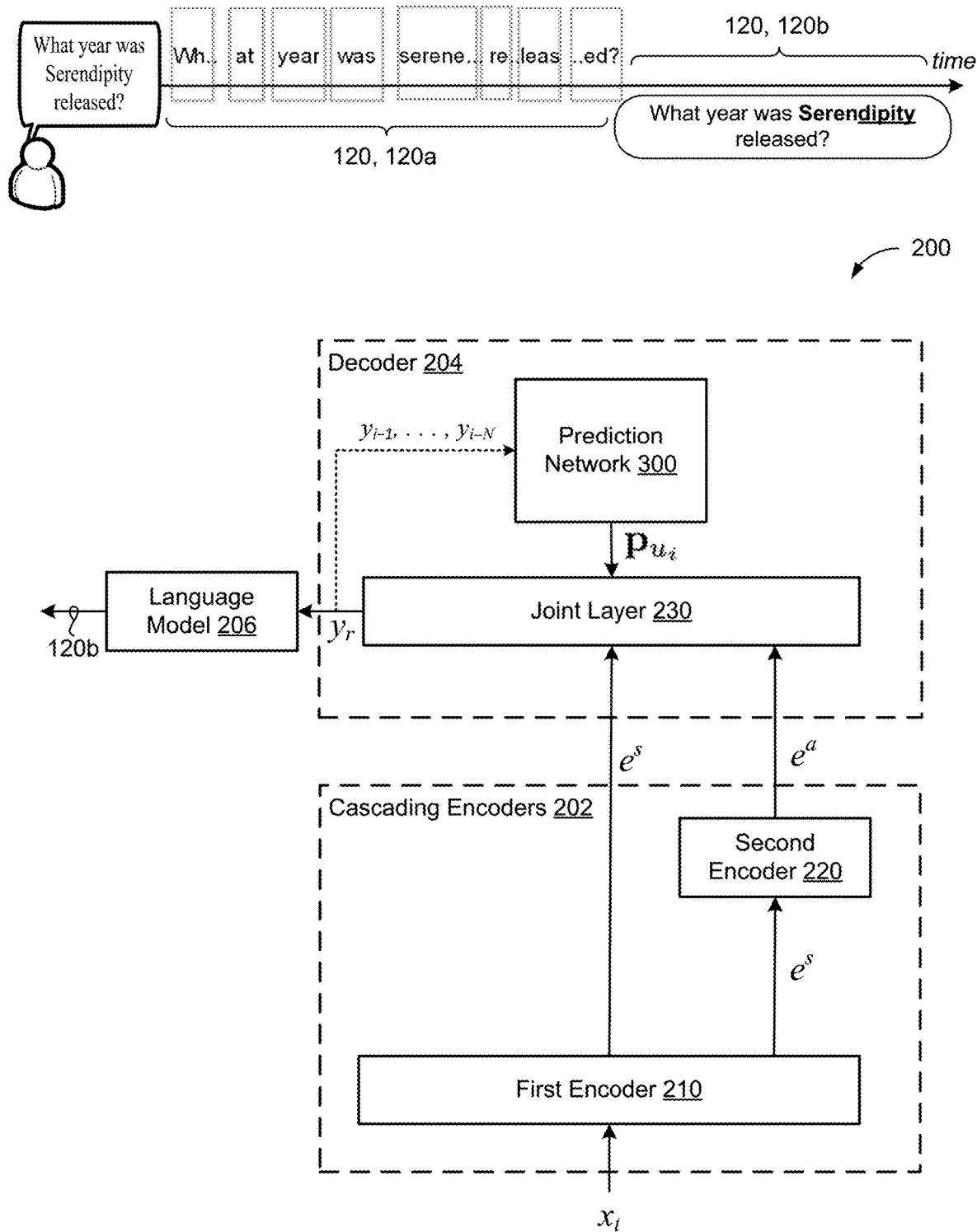
FIG. 2 is a schematic view of the speech recognition model and the language model architecture of FIG. 1.

FIG. 2 includes an example model 200 capable of operating in various combinations of streaming and non-streaming modes. Specifically, the model 200 includes a cascading encoder 202, a decoder 204, and an external LM 206. The cascading encoder 202 refers to a model structure where the encoding pathway includes two encoders 210, 220 that cascade such that the output of one encoder 210 feeds the input of the other encoder 220 prior to decoding. Here, the encoders 210, 220 can be cascaded irrespective of the underlying architecture for each encoder. In some examples, the encoders 210, 220 include a stack of 512-dimension conformer layers. Causal convolution and left-context attention layers may be used for each conformer layer to strictly restrict the model use no future inputs. A multi-headed (e.g., 8 heads) attention mechanisms may be used in a self-attention layer. The cascades encoders 210, 220 may include 17 conformer layers. Here, the causal encoder 210 may include 15 conformer layers while the non-causal encoder 210 may include two conformer layers that take in additional right context (e.g., 5.04 seconds). Optionally, transformer layers may be used in lieu of conformer layers.

In other implementations, one encoder is constructed with an LSTM structure while the other encoder is constructed using bi-directional LSTM layers or conformer layers (e.g., a conformer-transducer). In other words, the encoders 210, 220 may have different architectures or similar architectures. For instance, the cascading encoder 202 may be roughly analogous to an acoustic model (AM) in a traditional ASR system, and may include a recurrent network of stacked Long Short-Term Memory (LSTM) layers. Here, the first encoder 210 is a streaming encoder that includes unidirectional Long Short Term Memory (LSTM) layers while the second encoder 220 is a non-streaming encoder that includes bidirectional LSTM layers or conformer layers. In a cascading encoder 202, where both encoders 210, 230 include LSTM layers, the second encoder 220 that receives the output of the first encoder 210 may take advantage of the LSTM layers of the first encoder 210 such that the second encoder 220 includes fewer LSTM layers than the first encoder 210 (and fewer LSTM layers than a fully non-streaming model). By having fewer LSTM layers, the cascading encoder 202 may reduce the number of more computationally expensive bidirectional layers, making the model 200 more streamlined than simply combining a traditional streaming model with a traditional non-streaming model. In some implementations, in order to limit the amount of future context that the cascaded encoders model 200 sees, the second encoder 220 uses some number of conformer layers (e.g., two layers) with a particular amount of right context (e.g., five seconds of right context), while the first encoder 210 continues to use LSTM layers. For these implementations, each conformer layer in the second encoder 220 may have 640 units to match the LSTM layers and adds around 10 million additional parameters.

Still referring to FIG. 2, the first encoder 210 reads a sequence of d-dimensional feature vectors (e.g., acoustic frames 110 shown in FIGS. 1A and 1B) $x=(x_1, x_2, \ldots, x_T)$, where $x_t \in \mathbb{R}^d$, and produces, at each time step, a first higher-order feature representation. This first higher-order feature representation is denoted as $e^s$. Similarly, the second encoder 220 is connected in cascade to the first encoder 210, and is trained to receive the first higher order feature $e^s$ as input, and output a second higher order feature representation. This second higher order feature representation is denoted as $e^a$. Both the first encoder 210 and the second encoder 220 are directly connected to, and shared by, the decoder 204. Accordingly, the decoder 204 receives both the first higher order feature representation $e^s$ and the second higher order feature representation $e^a$ as inputs.

The decoder 204 may include a recurrent neural network-transducer (RNN-T) architecture having a joint layer 230 and a prediction network 300. The decoder 204 uses the joint layer 230 to combine (i.e., when the model 200 operates in non-streaming mode) the first and second higher order feature representations $e^s$, $e^a$, output by the cascading encoder 202, as well as an embedding output from the embedding lookup 300 for the previous prediction $y_{r-1}$), in order to produce a decoder output. The decoder output is then passed to the external LM 206 that rescores/improves the initial outputs from the decoder 204 with techniques such as lattice rescoring or n-best re-ranking. In other words, the decoder 204 produces predictions and the external LM 206 finalizes the prediction by improving recognition accuracy on rare words or long-tail proper nouns. When the model 200 operates in the streaming mode, the joint layer 230 receives the output of the embedding lookup 300 and only the first higher order feature representation $e^s$ output from the first encoder 210.

The decoder output can be a probability distribution, P $(y_i|y_{i-1}, \ldots, y_0, x)$, over the current sub-word unit, $y_i$, given the sequence of the N previous non-blank symbols 301 previous units, $\{y_{i-1}, \ldots, y_{i-N}\}$, and input, x. Although not illustrated, the model 200 may include a Softmax layer that receives the output of the decoder 204. In some implementations, the Softmax layer is separate from the decoder 204 and processes the output, $y_r$, from the decoder 204. The output of the Softmax layer is then used in a beam search process to select orthographic elements. In some implementations, the Softmax layer is integrated with the decoder 204, such that the output $y_r$ of the decoder 204 represents the output of the Softmax layer.

Figure 3:
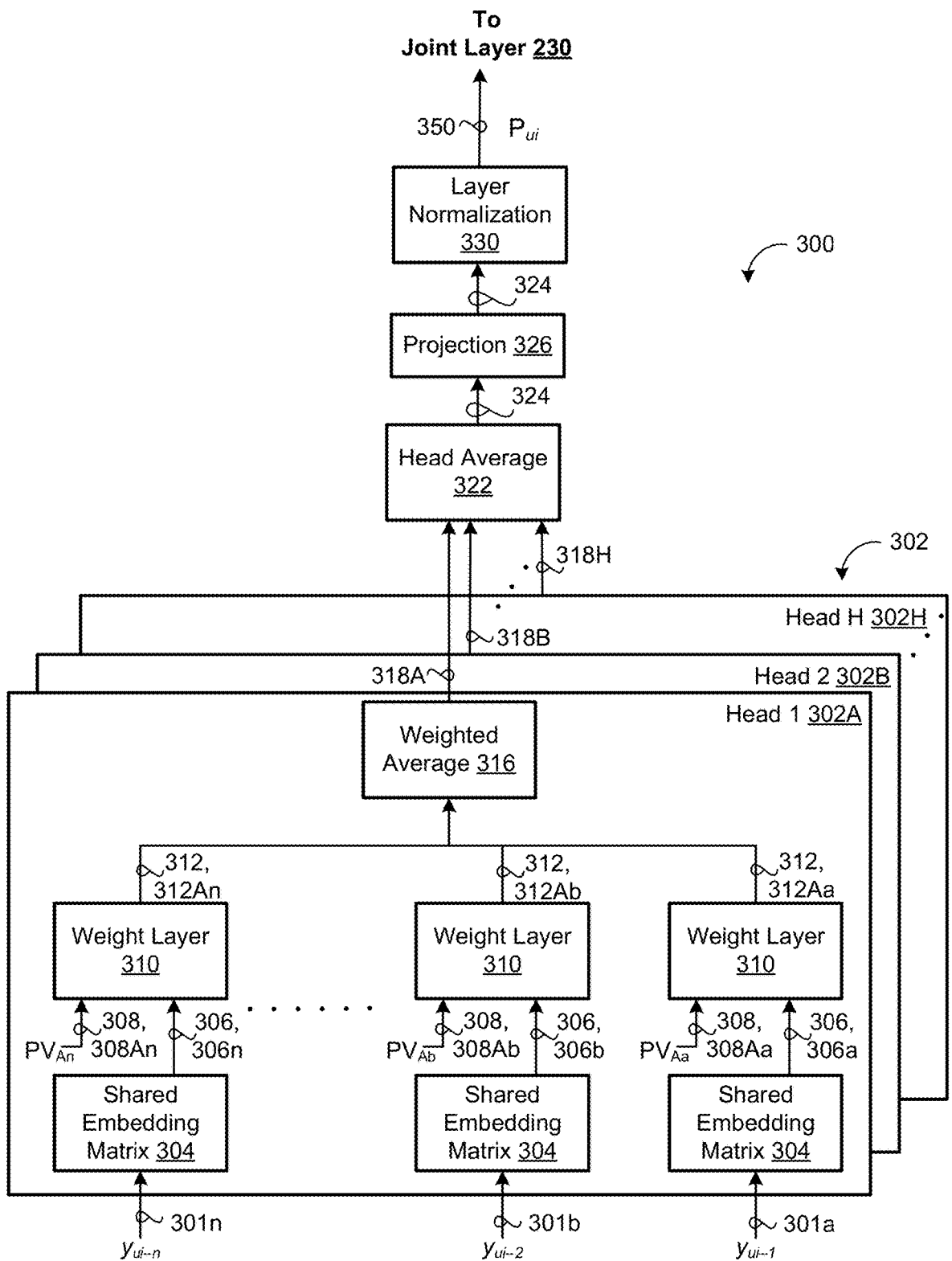
FIG. 3 is a schematic view of an example tied and reduced prediction layer of a prediction network of the speech recognition model of FIG. 2.

In some examples, the prediction network 300 has two 2,048-dimensional LSTM layers, each of which is also followed by 640-dimensional projection layer, such that the LSTM-based embedding lookup 300 may have about 23.4 million parameters. When the prediction network 300 includes LSTM layers, to contribute to techniques for reducing the size of the prediction network 300 without sacrificing accuracy/performance of the model 200, the prediction network 300 may include a stateless prediction network that receives a limited-history sequence of non-blank symbols $y_{ui-n}, \ldots, y_{ui-1}$ limited to the N previous non-blank symbols 301 output by the final Softmax layer. For instance, FIG. 3 shows the stateless prediction network 300 of the model 200 receiving, as input, a sequence of non-blank symbols $y_{ui-n}, \ldots, y_{ui-1}$ that is limited to the N previous non-blank symbols 301a-n output by the final Softmax layer. In some examples, N is equal to two. In other examples, N is equal to five, however, the disclosure is non-limiting and N may equal any integer. The sequence of non-blank symbols 301a-n indicates initial speech recognition results 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{ui-n}, \ldots, y_{ui-1}$. The respective position vector PV 308 assigned to each non-blank symbol indicates a position in the history of the sequence of non-blank symbols (e.g., the N previous non-blank symbols output by the final Softmax layer). For instance, the first position vector $PV_{Aa}$ is assigned to a most recent position in the history, while the last position vector $PV_{An}$ is assigned to a last position in the history of the N previous non-blank symbols output by the final Softmax layer. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 301a-n, $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308Ba-Bn, . . . , and the $H^{th}$ head 302 H defines another different row of position vectors $PV_{Ha-Hn}$ 308Ha-Hn.

For each non-blank symbol in the sequence of non-blank symbols 301a-n received, the first head 302A also weights, via a weight layer 310, the corresponding embedding 306 proportional to a similarity between the corresponding embedding and the respective position vector PV 308 assigned thereto. In some examples, the similarity omc; ides a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_e (X_{n,e} * P_{h,n,e}) \quad (1)$$

In Equation 1, h represents the index of the heads 302, n represents position in context, and e represents the embedding dimension. Additionally, in Equation 1, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $Pu_i$ 350 at the corresponding time step from the plurality of time steps. The prediction network 300 generates only a single embedding vector $Pu_i$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $Pu_i$ 350.

In other configurations, the prediction network 300 may instead include conformer or transformer layers in lieu of LSTM layers. In other examples, the prediction network 300 includes a V2 embedding look up table in lieu of a network of LSTM, transformer, or conformer layers. At each time step, the V2 embedding lookup table may receive, as input, the previous two predictions (e.g., 1-hot vectors) output by the joint layer 230, compute a respective embedding $d_1$, $d_2$ for each of the previous two predictions, and provide a concatenated output [$d_1$, $d_2$] to the joint layer 230. Comparatively, the V2 embedding lookup table may have only about two (2) million parameters, whereas an LSTM-based prediction network may include about 23.4 million parameters. Finally, the joint layer 230 may also be a one-layer neural network with 640 hidden units. The Softmax layer may be composed of a unified word piece or grapheme set that is generated using all unique word pieces or graphemes in a plurality of training data sets.

The decoder 204 is configured to generate, at each output step, a probability distribution over possible speech recognition hypotheses. Stated differently, the joint layer 230 generates, at each output step (e.g., time step), a probability distribution over possible speech recognition hypotheses. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint layer 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint layer 230 can include a posterior probability value for each of the different output labels. Thus, if there are 100 different output labels representing different graphemes or other symbols, the output of the joint layer 230 can include 100 different probability values, one for each output label. The probability distribution can then be used to select and assign scores to candidate orthographic elements (e.g., graphemes, wordpieces, and/or words) in a beam search process (e.g., by the Softmax layer) for determining the transcription 120.

In some implementations, the LM 206 includes a unidirectional conformer that looks back a predetermined number of tokens (e.g., seven tokens) for each output wordpiece model prediction. The conformer LM 206 may have a stack of layers (e.g., 12 layers) where each layer includes a model dimension of 768, a feedforward layer dimension of 2048, and a six-head attention. In these implementations, the conformer LM 206 is trained to predict 4,096 wordpieces.

Integrating ASR models with external LMs typically requires shallow fusion. However, overconfidence of the cascading encoder 202 and the decoder 204 can make weighting difficult and often lead to high deletions of words. Accordingly, a Hybrid Autoregressive Transducer (HAT) model may be utilized to factor out an internal loss language model score $p_{ILM}(y)$ of the model 200 so that the effective score of the model 200 can be represented as follows.

$$\log p(x \mid y) \approx \log p(y \mid x) - \log plm(y) \qquad (2)$$

Accordingly, HAT factorization allows the integration of the model 200 with the external LM 206 without requiring coverage penalties as follows.

$$y^* = \operatorname{argmax}_y[\lambda_1 \log p(y \mid x) - \lambda_2 \log pilm(y) + \log plm(y)] \qquad (3)$$

where $\lambda_1$ and $\lambda_2$ denote weights assigned to the external LM 206 and the internal language model, respectively. By using HAT factorization during the training process 300, the LM 206 is better integrated with the cascading encoder 202 and decoder 204.

Continuing with the example in FIG. 2, in some implementations, the model 200 operates in both the streaming and non-streaming modes in parallel. When operating in both streaming and non-streaming mode at the same time, the model 200 first performs streaming speech recognition on the audio data 110 using the first encoder 210 to generate the first higher order representation $e^s$ for both the second encoder 220 and the decoder 204. The decoder 204 then produces the partial speech recognition results 120, 120a. The model 200 also performs non-streaming speech recognition on the encoded audio data 110 where the second encoder 220 uses the first higher order representation $e^s$ received from the first encoder 210 to generate the second higher order representation $e^a$. The decoder 204 then produces a speech recognition result, which is then rescored by the LM 206 to produce the final speech recognition result 120, 120b. As noted by the time, the first encoder 210 produces the partial speech recognition results 120a while the second encoder 220 waits for the output of the first encoder 210. Finally, the LM 206 may bias the output from the decoder 204 to generate the final speech recognition result 120b. Thus, the final speech recognition result 120b for the input utterance 106 may be delayed from the partial speech recognition results 120a for the input utterance. As mentioned previously, the first encoder 210 may identify an endpoint of the utterance 106 that triggers a microphone closing event and triggers the final speech recognition result 120b to be emitted.

In some implementations, to further reduce the size of the decoder 204, i.e., the prediction network 300 and the joint layer 230, parameter tying between the prediction network 300 and the joint layer 230 is applied. Specifically, for a vocabulary size $|V|$ and an embedding dimension $d_e$, the shared embedding matrix 304 at the prediction network 300 is $E \in \mathbb{R}^{|V| \times d_e}$. Meanwhile, a last hidden layer includes a dimension size $d_h$ at the joint layer 230, feed-forward projection weights from the hidden layer to the output logits will be $W \in \mathbb{R}^{d_h \times |V|+1|}$, with an extra blank token in the vocabulary. Accordingly, the feed-forward layer corresponding to the last layer of the joint layer 230 includes a weight matrix $[d_h, |V|]$. By having the prediction network 300 to tie the size of the embedding dimension $d_e$ to the dimensionality $d_h$ of the last hidden layer of the joint layer 230, the feed-forward projection weights of the joint layer 230 and the shared embedding matrix 304 of the prediction network 300 can share their weights for all non-blank symbols via a simple transpose transformation. Since the two matrices share all their values, the decoder 204 only needs to store the values once on memory, instead of storing two individual matrices. By setting the size of the embedding dimension $d_e$ equal to the size of the hidden layer dimension $d_h$, the decoder 204 reduces a number of parameters equal to the product of the embedding dimension $d_e$ and the vocabulary size $|V|$. This weight tying corresponds to a regularization technique.

Figure 4:
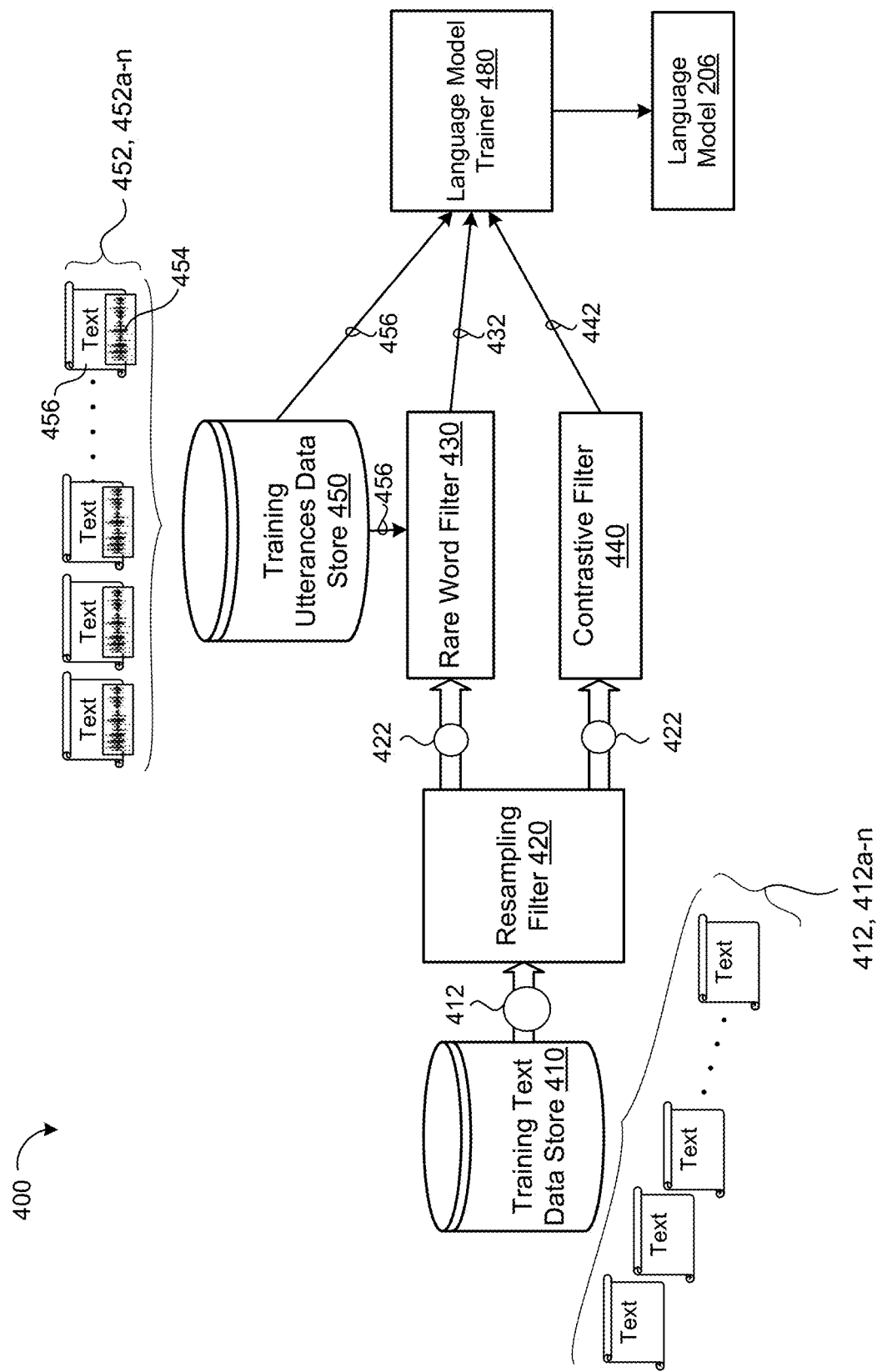
FIG. 4 is a schematic view of a data selection pipeline for training a language model.

FIG. 4 shows an example of a data selection pipeline 400 for training the external LM 206 of the ASR system 109. Generally, large training data sets, such as a corpus of training text samples 412, 412a-n are used to train language models that execute in computing environments (e.g., the cloud) that are not inhibited by processing, memory/storage, and power constraints. However, in some configurations, the ASR system 109 resides on the user device 10 of the user 104, thereby limiting the number of parameters in the LM 206, and consequently, the number of training samples in the training set used to train the LM 206. To resolve this, a data selection pipeline 400 processes the corpus of training text samples 412 to reduce the amount of training data (i.e., training text samples) needed to train the LM 206 to accurately recognize rare words, thereby allowing the ASR system 109 including the external LM 206 to run on-device where processing and/or memory/storage resources is limited. In other words, the data selection pipeline 400 filters the training text samples from the corpus to identify a subset of training samples sufficient for improving rare-word recognition. The corpus of training text samples 412 may include 213 billion sentences with a size of about 12 terabytes, wherein 7.2 billion of the samples are distinct. The pipeline 400 may reduce the number of samples 412 in the corpus to about only four (4) billion sentences for training the LM 206, which is 53× smaller than the original corpus and without degradation in overall performance of the LM 206 in terms of word error rate (WER).

As shown in FIG. 4, the data selection pipeline 400 uses a resampling filter 420, a rare word filter 430, and a contrastive filter 440 to reduce the number of the training text utterances in the corpus of training text samples 412 for training the LM 206. The data selection pipeline 400 obtains the corpus of training text samples 412, 412a-n stored in a training text data store 410 and a plurality of training utterances 452, 452a-n stored in a training utterances data store 450. The training utterances 452 stored in the training utterances data store 450 are used for training the ASR model 200 and each training utterance 452 includes audio data 454 corresponding to an utterance and a corresponding transcription 456 of the utterance. While FIG. 4 shows the pipeline 400 employing each of the resampling filter 420, the rare word filter 430, and the contrastive filter 440 for selecting training text data, the pipeline may use only one or two of the resampling filter 420, the rare word filter 430, and the contrastive filer 440 for selecting training text data.

The resampling filter 420 receives the corpus of training text samples 412 stored in the training text data store 410 and executes a resampling function to identify rare words (e.g., words that occur less frequently) in the corpus by identifying and removing high frequency training text samples from the corpus to output a set of low frequency training text samples (also referred to as 'set of training text samples') 422 corresponding samples from the corpus of training text samples 412 that include rare words. In the example shown, the resampling filter 420 measures frequency at the sentence level rather than at the word level for the sake of simplicity. The resampling filter 420 may, however, measure rareness of a sentence from an aggregate of its own words without departing from the scope of the present disclosure. As used herein, a word or sentence is more rare when it has a lower frequency (there are fewer occurrences of it) in the corpus relative to other words or sentences. The term "tailedness" may be used to describe the relative amount of rare words occurring the corpus of training text samples 412. The frequency distribution of the corpus of training text samples 412 as a whole is linear on a log-log plot and is expressed by:

$$\text{distinct\_count}(f) \approx Af^{-\alpha} \quad (4)$$

where f denotes the frequency and A denotes the number of distinct training text samples 412 (i.e., having a frequency f of one). By changing the power a, the distribution changes. For example, a larger $\alpha$ results in a distribution with a heavy frequency of rare words. Examples where $\alpha$ approaches infinity indicate that there are no duplicate training texts 412 in the plurality of training text samples 412. However, the plurality of training text samples 412 stored in the training text data store 410 include an $\alpha$ of 1.1-2.5. Furthermore, training text samples 412 occurring at an excessive frequency rate (e.g., "home" in a Maps domain) deviate from the linear distribution of the frequency distribution.

To filter the high frequency training texts from the corpus of training text samples 412, thereby increasing the number of rare words in the set of low frequency training text samples 422, the resampling filter 420 may execute a resampling function including one of a simple power resampling function, a forced power resampling function, or a soft logarithmic resampling function. Simple power resampling may include tuning the rareness of the frequency distribution distinct_count(f) by applying a parameter $\beta$. The simple power frequency distribution may then be expressed as $Af^{-\alpha\beta}$. In other implementations, forced power resampling is used to manage the excessive frequency training text samples in the corpus of training text samples 412 by forcing each training text 412 to fit a line fit. For example, the line fit for a Maps domain may indicate a distinct count of 1 corresponding to a frequency of $10^6$. In these examples, for each training text sample that has a distinct_count of 1, its resampled frequency $f_1$ will be 106 regardless of its original frequency $f_0$. In this example, a training text sample with a high original frequency $f_0$ (e.g., 108) is forced to a resampled frequency $f_1$ of 106. This forced power resampling operation is expressed as:

$$F(f) := \left| \frac{\text{distint\_count}(f)}{A} \right|^{\alpha} \quad (5)$$

Alternatively, the resampling filter 420 may execute a soft logarithmic resampling function, which matches the original frequency distribution distinct_count(f) of the corpus of training text samples 412 and then removes training texts from the corpus that exceed a threshold. The soft logarithmic function is expressed by:

$$f_1 = f_c \log\left(1 + \frac{f_0}{f_c}\right) \quad (6)$$

Where $f_c$ denotes a threshold frequency.

Once the resampling filter 420 removes the high frequency training texts from the corpus of training text samples 412 to output the set of training text samples 422 that include rare words, the set of training text samples 422 are provided as input to the rare word filter 430 and the contrastive filter 440. Notably, the removal of high frequency training text samples from the corpus is desirable since these samples would provide a distributional bias that may prevent the LM 206 from learning a long tail of form the corpus that includes many rare words. The rare word filter 430 identifies a subset of rare-word training text samples 432 that include words that do not appear in the transcriptions 456 from the set of training utterances 452 or appear in the transcriptions 456 from the set of training utterances 452 less than a threshold number of times. Likewise, the contrastive filter 440 identifies a subset of target domain training text samples 442 within the set training text samples 422 that match a target domain associated with the training utterances 452 used to train the ASR model 200. The training utterances 452 may be referred to as ASR training utterances 452 each including ASR audio data 454 paired with corresponding ASR transcripts 456. The data selection pipeline 400 then combines ASR transcripts 456, the rare word training text samples 432, and the target domain training text samples 442 into mini-batches for use by a language model trainer 480 to train the LM 206. The mini-batches may be combined according to a sampling ratio (e.g., 20%/40%/40% for ASR transcriptions 456/rare word training text samples 432/target domain training text samples 442).

The rare word filter 430 directly filters the transcriptions 456 from the set of ASR training utterances 452 that include words that appear in the set of training text samples 422 using a frequency threshold $f_t$ (e.g., 15) to identify training text samples for inclusion in the subset of rare-word training text samples 432. The rare word filter 420 also identifies any training text samples 422 that do not appear in the transcriptions 456 for inclusion in the subset of rare-word training text samples 432. The contrastive filter 440 applies contrastive selection/filtering on the set of low frequency training text samples 422 output by the resampling filter 420 to identify a subset of target domain training text samples 442 that match a target domain associated with the set of training utterances 452 used to train the ASR model 200. The corpus of training text samples 412 may include text samples collected from domains that are different than the domain the ASR model 200 is trained to recognize speech. For instance, the text samples may collected form typed search queries containing more website names while the target domain of the ASR model 200 corresponds to voice search containing more voice commands. This contrastive selection is calculated for each training text sample in the set of low frequency training text samples 422 by:

$$\text{score}(x) = \mathcal{L}_{target}(x) - \mathcal{L}_{background}(x) \quad (7)$$

where $\mathcal{L}$ denotes the logarithmic perplexity of the training text sample 422, target denotes the target LM 206, and background denotes a background Language Model trained on a fully deduplicated set of training data. The contrastive selection is then tuned on the transcriptions 456 of the training utterances 452 to produce the target LM 206. The score for a training text sample will be lower when the training text sample is closer to the transcriptions 456 of the training utterances 452 used to train the ASR model 200. The contrastive filter 440 then may discard a training text sample 422 that is above a threshold, to identify the subset of target domain training texts 442 from the set of low frequency training text samples 422 that are below the threshold. As used herein, a target domain associated with the training utterances may include assistant queries, voice search queries, navigation queries, or utterances associated with any other domain. Notably, the ASR model 200 of FIGS. 1-3 is trained on the training utterances 452 that each include audio data 454 of a corresponding utterance and a corresponding transcription 456 of the utterance that serves as a ground-truth label for the audio data 454.

Figure 5:
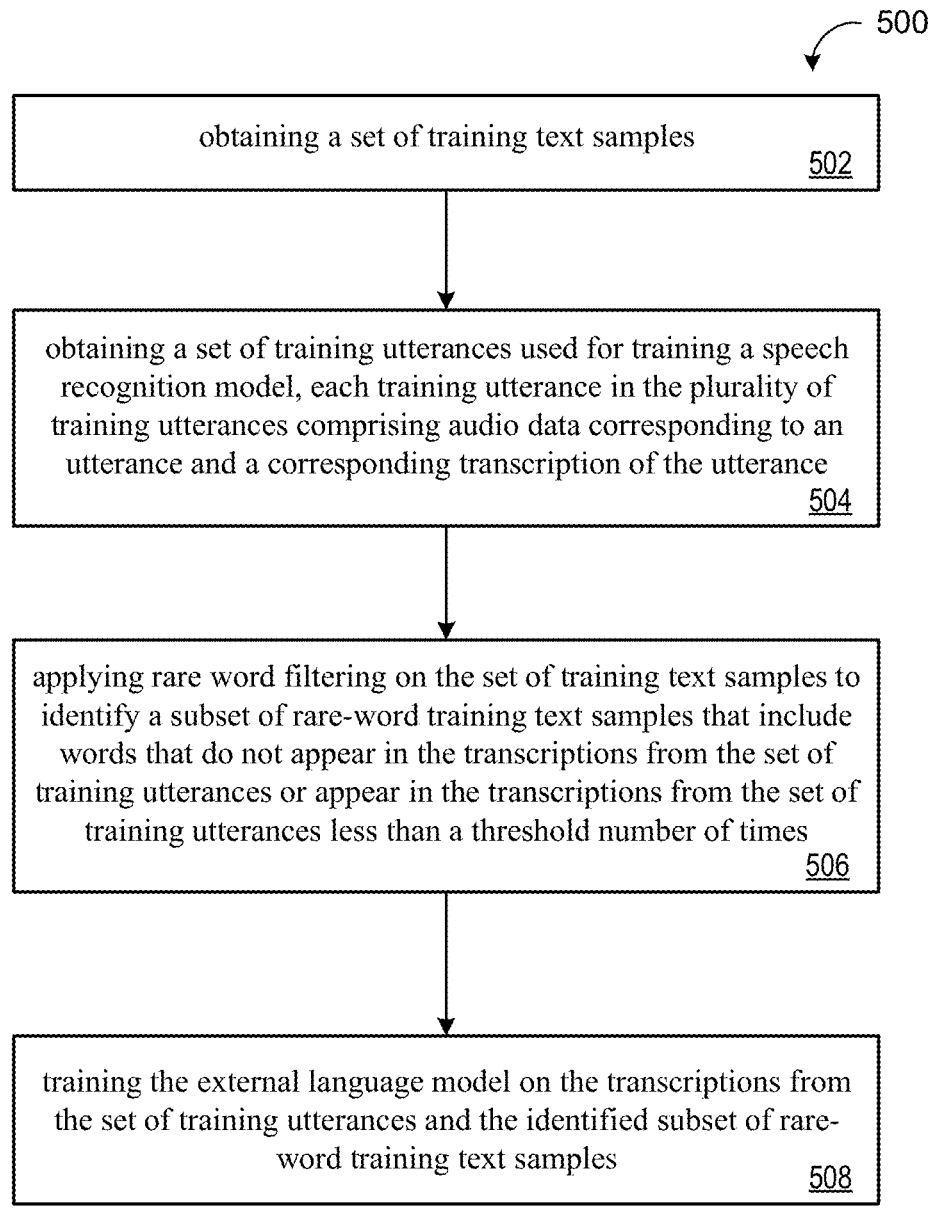
FIG. 5 is a schematic view of an example arrangement of operations for a method of training a language model.

FIG. 5 includes a flowchart of an example arrangement of operations for a method 500 of training a language model 206 for rare-word speech recognition. The method 500 includes, at operation 502, obtaining a set of training text samples 422. At operation 504, the method 500 also includes obtaining a set of training utterances 452 used for training a speech recognition model 200 (e.g., an automatic speech recognition (ASR) model 200), each training utterance 452 in the plurality of training utterances 452 including audio data 454 corresponding to an utterance and a corresponding transcription 456 of the utterance.

At operation 506, the method 500 includes applying rare word filtering on the set of training text samples 422 to identify a subset of rare-word training text samples 432. The subset of rare-word training text samples 432 include words that do not appear in the transcriptions 456 from the set of training utterances 452 or appear in the transcriptions 456 from the set of training utterances 452 less than a threshold number of times. The method 500 further includes, at operation 508, training the external language model 206 on the transcriptions 456 from the set of training utterances 452 and the identified subset of rare-word training text samples 432.

Figure 6:
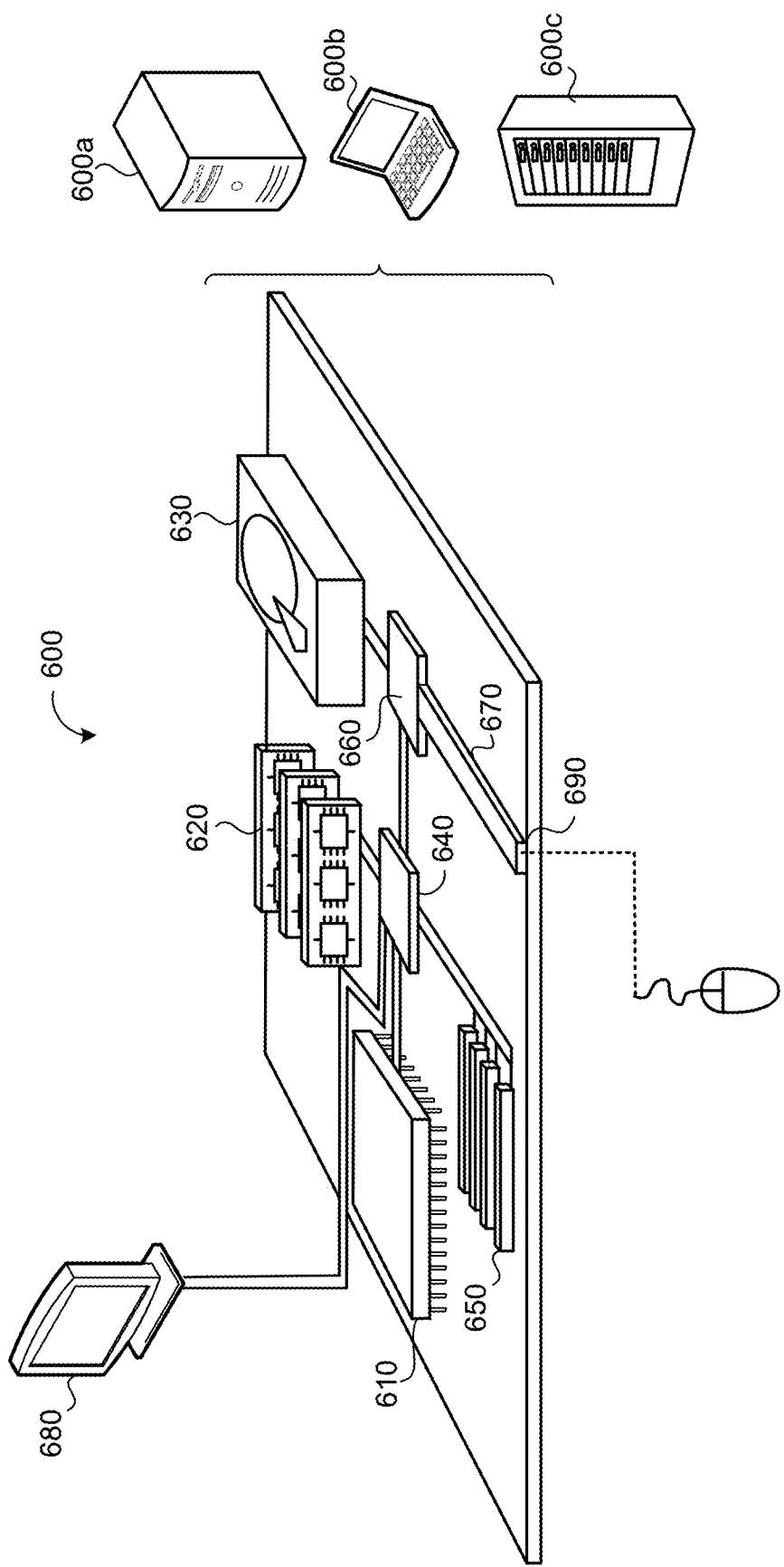
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the implementations described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (also referred to as "data processing hardware 610" that may include the data processing hardware 12 of the user device 10 or the data processing hardware 62 of the remote computing device 60) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (also referred to as "memory hardware 620" that may include the memory hardware 14 of the user computing device 10 or the memory hardware 64 of the remote computing device 60) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:
   receiving a corpus of training text samples, each training text sample in the corpus of training text samples comprising a corresponding sentence;
   executing a resampling function on the corpus of training text samples that downsamples a frequency distribution of the corpus of training text samples by:
     matching the frequency distribution of the corpus of training text samples up to a threshold frequency; and
     applying logarithmic scaling on the frequency distribution of the corpus of training text samples after the threshold frequency to identify high frequency training text samples as the training text samples from the corpus of training text samples that have corresponding frequencies exceeding the threshold frequency;
   obtaining a set of training text samples by removing the identified high frequency training text samples from the corpus of training text samples;
   applying rare word filtering on the training text samples to identify a subset of rare-word training text samples; and
   training a language model on the identified subset of rare-word training text samples.

2. The computer-implemented method of claim 1, wherein the operations further comprise determining the frequency distribution of the corpus of training text samples that identifies a corresponding frequency that each training text sample in the corpus of training text samples occurs relative to the corresponding frequencies of the other training text samples in the corpus of training text samples.

3. The computer-implemented method of claim 1, wherein the resampling function comprises one of a simple power resampling function, a forced power resampling function, or a soft logarithmic resampling function.

4. The computer-implemented method of claim 1, wherein the operations further comprise:
   applying contrastive filtering on the set of training text samples to identify a subset of target domain training text samples that match a target domain associated with the set of training text samples,
   wherein training the language model on the identified subset of rare-word training text samples further comprises training the language model on the identified subset of target domain training text samples that match the target domain.

5. The computer-implemented method of claim 1, wherein the language model comprises a neural language model.

6. The computer-implemented method of claim 5, wherein the neural language model comprises a stack of conformer layers or transformer layers.

7. The computer-implemented method of claim 1, wherein the operations further comprise:
obtaining a set of training utterances used for training a machine learning model, each training utterance comprising a corresponding transcription of an utterance,
wherein the identified subset of are rare training text samples includes words that do not appear in the transcriptions from the set of training utterances or appear in the transcriptions from the set of training utterances less than a threshold number of times.

8. The computer-implemented method of claim 7, wherein:
the machine learning model comprises a machine translation model; and
training the language model on the identified subset of rare-word training text samples further comprises training the language model on the transcriptions from the set of training utterances.

9. The computer-implemented method of claim 7, wherein:
the machine learning model comprises an automatic speech recognition (ASR) model;
each training utterance in the set of training utterances used for training the ASR model further comprises audio data corresponding to the utterance; and
training the language model on the identified subset of rare-word training text samples further comprises training the language model on the transcriptions from the set of training utterances.

10. The computer-implemented method of claim 9, wherein the operations further comprise integrating a trained external language model with the trained ASR model, the trained external language model configured to rescore probability distributions over possible speech recognition hypotheses predicted by the trained ASR model.

11. A system comprising
data processing hardware; and
memory hardware storing instructions that when executed on the data processing hardware causes the data processing hardware to perform operations comprising:
receiving a corpus of training text samples, each training text sample in the corpus of training text samples comprising a corresponding sentence;
executing a resampling function on the corpus of training text samples that downsamples a frequency distribution of the corpus of training text samples by:
matching the frequency distribution of the corpus of training text samples up to a threshold frequency; and
applying logarithmic scaling on the frequency distribution of the corpus of training text samples after the threshold frequency to identify high frequency training text samples as the training text samples from the corpus of training text samples that have corresponding frequencies exceeding the threshold frequency;
obtaining a set of training text samples by removing the identified high frequency training text samples from the corpus of training text samples;
applying rare word filtering on the training text samples to identify a subset of rare-word training text samples; and
training a language model on the identified subset of rare-word training text samples.

12. The system of claim 11, wherein the operations further comprise determining the frequency distribution of the corpus of training text samples that identifies a corresponding frequency that each training text sample in the corpus of training text samples occurs relative to the corresponding frequencies of the other training text samples in the corpus of training text samples.

13. The system of claim 11, wherein the resampling function comprises one of a simple power resampling function, a forced power resampling function, or a soft logarithmic resampling function.

14. The system of claim 11, wherein the operations further comprise:
applying contrastive filtering on the set of training text samples to identify a subset of target domain training text samples that match a target domain associated with the set of training text samples,
wherein training the language model on the identified subset of rare-word training text samples further comprises training the language model on the identified subset of target domain training text samples that match the target domain.

15. The system of claim 11, wherein the language model comprises a neural language model.

16. The system of claim 15, wherein the neural language model comprises a stack of conformer layers or transformer layers.

17. The system of claim 11, wherein the operations further comprise:
obtaining a set of training utterances used for training a machine learning model, each training utterance comprising a corresponding transcription of an utterance,
wherein the identified subset of rare-word training text samples includes words that do not appear in the transcriptions from the set of training utterances or appear in the transcriptions from the set of training utterances less than a threshold number of times.

18. The system of claim 17, wherein:
the machine learning model comprises a machine translation model; and
training the language model on the identified subset of rare-word training text samples further comprises training the language model on the transcriptions from the set of training utterances.

19. The system of claim 17, wherein:
the machine learning model comprises an automatic speech recognition (ASR) model;
each training utterance in the set of training utterances used for training the ASR model further comprises audio data corresponding to the utterance; and
training the language model on the identified subset of rare-word training text samples further comprises training the language model on the transcriptions from the set of training utterances.

20. The system of claim 19, wherein the operations further comprise integrating a trained external language model with the trained ASR model, the trained external language model configured to rescore probability distributions over possible speech recognition hypotheses predicted by the trained ASR model.

* * * * *